United States Patent
Eklöf et al.

(10) Patent No.: US 10,708,822 B2
(45) Date of Patent: Jul. 7, 2020

(54) WIRELESS DEVICE, A NETWORK NODE, AND METHODS THEREIN

(71) Applicant: Telefonaktiebolaget L M Ericsson (publ), Stockholm (SE)

(72) Inventors: Cecilia Eklöf, Täby (SE); Sofia Brismar, Lidingö (SE); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 747 days.

(21) Appl. No.: 14/904,549

(22) PCT Filed: Dec. 22, 2015

(86) PCT No.: PCT/SE2015/051385
§ 371 (c)(1),
(2) Date: Jan. 12, 2016

(87) PCT Pub. No.: WO2016/122373
PCT Pub. Date: Aug. 4, 2016

(65) Prior Publication Data
US 2016/0373967 A1    Dec. 22, 2016

Related U.S. Application Data

(60) Provisional application No. 62/109,812, filed on Jan. 30, 2015.

(51) Int. Cl.
*H04M 3/00* (2006.01)
*H04W 28/18* (2009.01)
*H04W 8/22* (2009.01)

(52) U.S. Cl.
CPC ............. *H04W 28/18* (2013.01); *H04W 8/22* (2013.01)

(58) Field of Classification Search
None
See application file for complete search history.

(56) References Cited

U.S. PATENT DOCUMENTS

| | | | |
|---|---|---|---|
| 2003/0078072 A1 | 4/2003 | Serceki et al. | |
| 2006/0040645 A1* | 2/2006 | Grilli | H04W 8/245 455/412.1 |
| 2016/0165433 A1* | 6/2016 | Larignon | H04W 8/205 455/419 |

FOREIGN PATENT DOCUMENTS

| CN | 1863369 A | 11/2006 |
|---|---|---|
| CN | 101032136 A | 9/2007 |

(Continued)

OTHER PUBLICATIONS

Kitazoe_WO 2006-104946 A1.pdf.*

(Continued)

*Primary Examiner* — Jinsong Hu
*Assistant Examiner* — Alexander J Yi
(74) *Attorney, Agent, or Firm* — Sage Patent Group

(57) ABSTRACT

A wireless device (208) and a method for modifying a configuration. The wireless device is operating in a wireless communications network (200). The wireless device receives a reconfiguration message comprising a difference relating to one or more parameters of a configuration, which configuration is associated with a first identity and stored in the wireless device. The wireless device modifies, based on the difference, the one or more parameters of the stored configuration, which modification results in a result configuration, and stores the result configuration with a second identity.

11 Claims, 7 Drawing Sheets

(56) References Cited

FOREIGN PATENT DOCUMENTS

| CN | 103782648 A | 5/2014 |
|---|---|---|
| WO | 2006020983 A2 | 2/2006 |
| WO | 2006104946 A1 | 10/2006 |

OTHER PUBLICATIONS

3GPP, "3rd Generation Partnership Project; Technical Specification Group Radio Access Network; Radio Resource Control (RRC); Protocol specification (Release 12)", 3GPP TS 25.331 V12.0.0, Dec. 2013, 1-2120.
Unknown, Author, "Re-usable Configurations in RRC Signaling", Ericsson, 3GPP TSG RAN WG2 #88, R2-144891, San Francisco, US, Nov. 17-21, 2014, 1-3.
Chinese Office Action dated Apr. 2, 2020 for Chinese Patent Application No. 201580074748.9, 15 pages.

\* cited by examiner

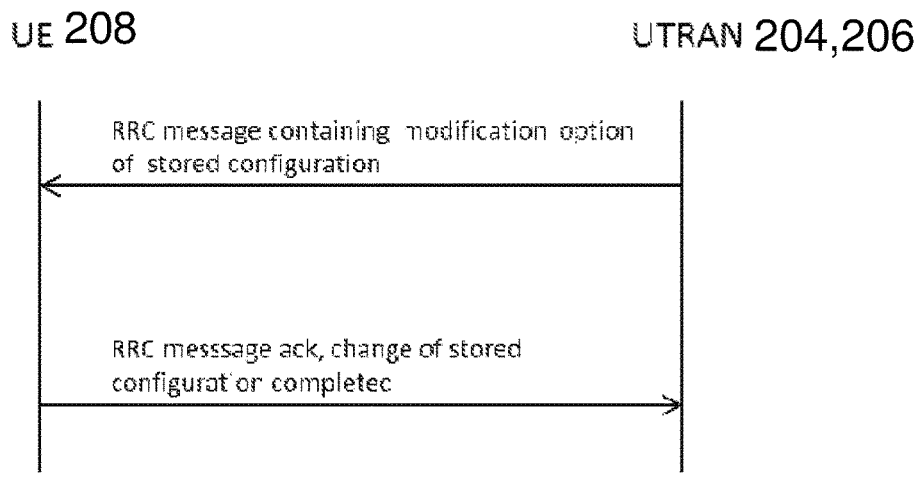
Figure 5 Exemplifying flowchart for modifying configurations
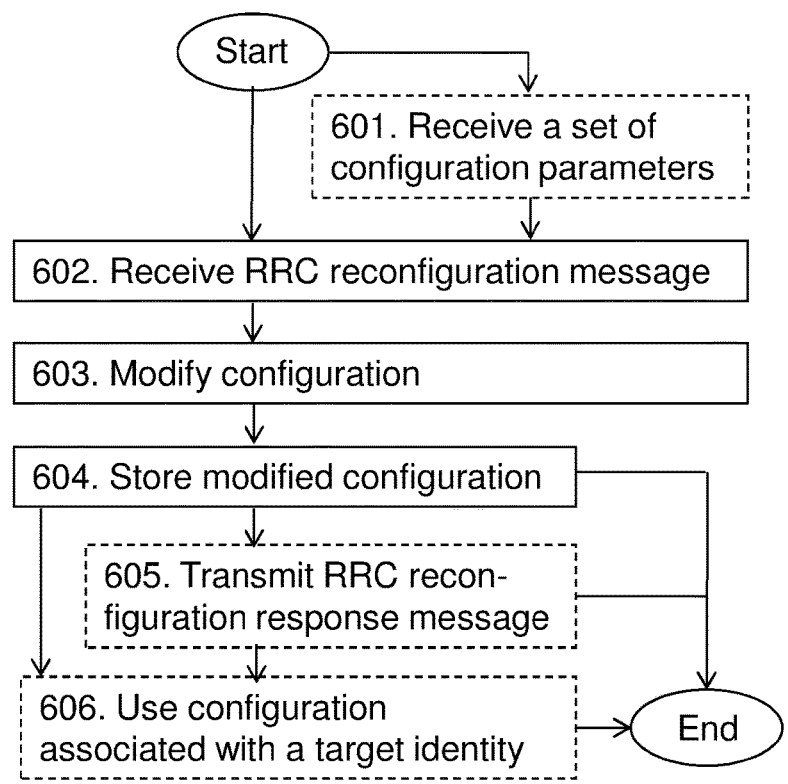
Figure 6 Method performed by wireless device 208

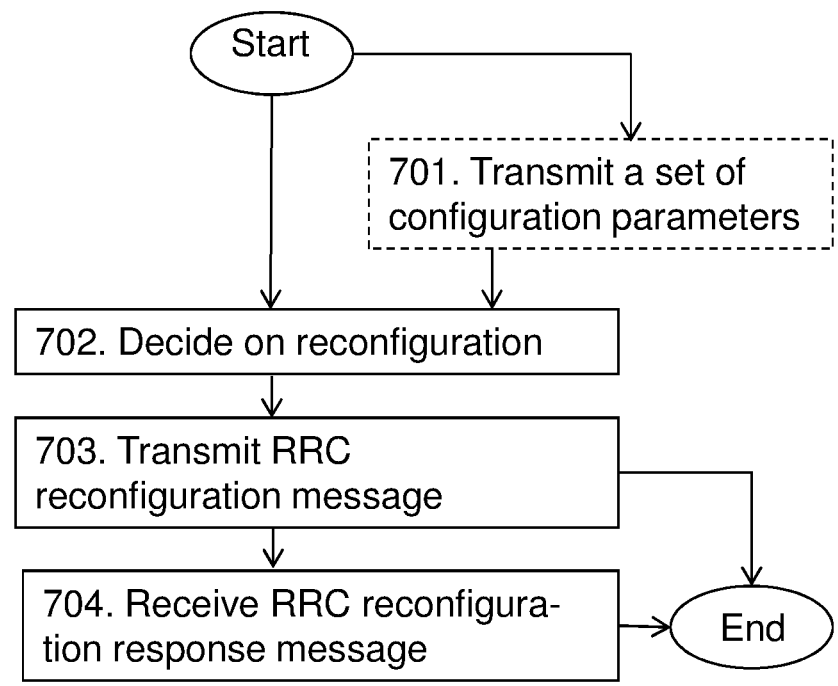
Figure 7 Method performed by Network node 204
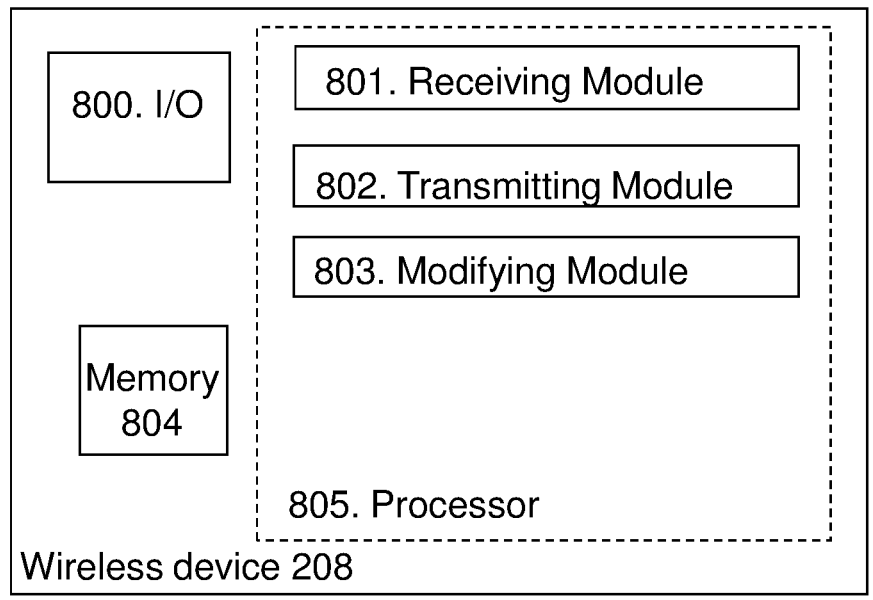
Figure 8

WIRELESS DEVICE, A NETWORK NODE, AND METHODS THEREIN

TECHNICAL FIELD

Embodiments herein relate generally to a wireless device, a network node and to methods therein. In particular they relate to modifying a configuration.

BACKGROUND

Communication devices such as wireless devices and terminals are also known as e.g. User Equipments (UE), mobile terminals, stations (STAs), wireless terminals and/or mobile stations. Terminals are enabled to communicate wirelessly in a wireless communications network or a cellular communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNodeB or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The RRC protocol is responsible for the establishment, maintenance and release of the Radio resource Control (RRC) connection between the UE and a Universal Terrestrial Radio Access Network (UTRAN) as well as the establishment, reconfiguration and release of Radio Bearers (RBs) and Signaling Radio Bearers (SRBs).

UTRAN is a collective term for the base stations and Radio Network Controllers (RNCs) which make up an Universal Mobile Telecommunications System (UMTS) radio access network.

Different RRC procedures like for example RB Setup, RB Release and RB Reconfiguration may be used to reconfigure the Radio Access Bearer (RAB-), RB/SRB-, transport channel- and physical channel parameters in the UE from a "source configuration" to a "target configuration". The reconfiguration is typically triggered by data activity, e.g. transmission of data, and/or inactivity of existing radio bearers or by setup and/or release of new radio bearers.

When the same action is repeated multiple times, e.g. at transmission of small amount of data, the UE will typically toggle, e.g. switch, between a limited set of configurations. Typically, the UTRAN needs to signal the new target configuration for each transition.

The following methods to signal a new target configuration to the UE are currently known according to the prior art:

Complete Configuration:

a full set of the above parameters specifying the target configuration, or a subset of the parameters representing a delta, e.g. a difference, between the source configuration and the target configuration, is included in the RRC message. This option may be used for most of the RRC procedures and is the commonly used method today.

Predefined Configurations:

Instead of signaling the complete configuration, the RRC message contains an identifier of one predefined configuration that the UE has already acquired via a System Information block (SIB), e.g. SIB16.

Default configuration: Instead of signaling the complete configuration, the RRC message contains an identifier to one of the default configurations specified by 3GPP in 25.331. Default configurations are only available for Circuit Switched (CS) radio bearers and stand-alone signaling radio bearers. There are no default configurations for Packet Switched (PS) bearers.

The methods relating to predefined and default configurations mentioned above may only be applied for the following RRC messages:

RRC Connection Setup message

Handover to UTRAN Command message

RB Reconfiguration message (only in case the message is sent through GSM EDGE Radio Access Network (GERAN) Iu mode)

A drawback with the above-described first method of signaling the complete target configuration, is that it will generate large RRC messages which may impact both latency and retainability, e.g. by increasing the latency and reducing the retainability, especially in bad radio condition or at the cell border. Signaling of delta configurations will reduce the message size to some extent but may on the other hand lead to a dropped call as a result of inconsistent configuration in the UE. A drawback with the above-described second and third methods, of using predefined configurations and default configurations, respectively, is that the number of use-cases where these configurations can be applied is very limited, e.g. only at RRC Connection Setup and Incoming Inter-Radio Access Technology (IRAT) Handover. The number of available configurations is also limited. Default configurations are only specified for CS bearers and stand-alone SRBs, and cannot be used for PS bearers. Even if UTRAN can specify its own predefined configurations in SIB16 the number of configurations must be limited in order to reduce the size of information sent on the broadcast channel. A large SIB16 may impact the overall SIB acquisition time and increase latency for other use-cases like for example call setup and cell reselection. Overall the predefined and default configurations have shown to be too inflexible and have not been used much. There is also limited support for these methods in the UEs.

In 3GPP release 13 a method for storing and re-using parameters in RRC signaling is introduced With this method, the first time a specific configuration is to be applied, the UTRAN sends an RRC message to the UE, e.g. the UTRAN sends a Radio Bearer Reconfiguration message with a set of parameters specifying the new target configuration. In addition to the configuration parameters an identity, e.g. a number, is included in the message. At reception of the message, the UE shall store the values of the defined set of parameters and associate the configuration with the identity included in the message. FIG. 1 illustrates the concept of stored configurations, which configurations sometimes are referred to as retrievable configurations. The figure shows how a wireless device, e.g. the above-mentioned UE, may store a number of configurations. When the UE is reconfigured from one configuration to another, only the target identity needs to be signaled, as the UE has all parameters stored for that configuration.

Next time the UTRAN wants to use the same configuration, only the identity needs to be included in the message. Both the UTRAN and the UE have stored the parameter values specifying the target configuration so this information does not have to be sent again. This method reduces the amount of signaling needed to the UE. However, a drawback with the method is that by using the concept for retrievable configurations, there is a risk that the number of configurations that the wireless device, e.g. the UE, would have to store is larger than what is practically possible. Defining new configurations may also add unnecessary overhead as the delta configuration compared to the currently used source configuration must be provided in the RRC message.

SUMMARY

An object of embodiments herein is to overcome at least some of the above-described drawbacks with the prior art and to improve the performance in a wireless communications network.

According to one aspect of embodiments herein, the object is achieved by a method performed by a wireless device for modifying a configuration. The wireless device is operating in a wireless communications network.

The wireless device receives a reconfiguration message comprising a difference relating to one or more parameters of a configuration, which configuration is associated with a first identity and stored in the wireless device.

The wireless device modifies, based on the difference, the one or more parameters of the stored configuration, which modification results in a result configuration.

Further, the wireless device stores the result configuration with a second identity.

According to another aspect of embodiments herein, the object is achieved by a wireless device for modifying a configuration. The wireless device is operable in a wireless communications network.

The wireless device is configured to receive a reconfiguration message comprising a difference relating to one or more parameters of a configuration, which configuration is associated with a first identity and stored in the wireless device.

Further, the wireless device is configured to modify, based on the difference, the one or more parameters of the stored configuration, which modification results in a result configuration.

Furthermore, the wireless device is configured to store the result configuration with a second identity.

According to another aspect of embodiments herein, the object is achieved by a method performed by a network node for assisting a wireless device to modify a configuration. The wireless device and the network node are operating in the wireless communications network.

The network node decides on a modification of one or more parameters of a configuration, which modification is to be performed by the wireless device, wherein the configuration is associated with a first identity and stored in the wireless device.

The network node transmits, to the wireless device, a reconfiguration message comprising a difference relating to the modification of the one or more parameters of the stored configuration.

According to another aspect of embodiments herein, the object is achieved by a network node for assisting a wireless device to modify a configuration. The wireless device and the network node are operable in the wireless communications network.

The network node is configured to decide on a modification of one or more parameters of a configuration, which modification is to be performed by the wireless device, and wherein the configuration is associated with a first identity and stored in the wireless device.

Further, the network node is configured to transmit, to the wireless device, a reconfiguration message comprising a difference relating to the modification of the one or more parameters of the stored configuration.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a carrier comprising the computer program, wherein the carrier is one of an electronic signal, an optical signal, a radio signal or a computer readable storage medium.

In the embodiments herein, the wireless device is configured to receive a reconfiguration message comprising a difference relating to one or more parameters of a configuration, to modify, based on the difference, the one or more parameters of the stored configuration and to store the result configuration. Thereby, the number of prestored configurations in the wireless device and the signaling of configurations in the wireless communications system can be reduced. This results in an improved performance in the wireless communications system since possible signaling overhead caused by the signaling of configurations is reduced or removed.

An advantage with embodiments herein is that the possibility to modify configurations limits the number of configurations that the wireless device would have to store which will save UE memory space. Some embodiments herein also provide a mechanism to reduce the signaling overhead when there is a need to define new configurations to be stored in the wireless device.

Another advantage is reduced usage of valuable radio resources.

BRIEF DESCRIPTION OF DRAWINGS

Examples of embodiments herein are described in more detail with reference to attached drawings in which:

FIG. 5 schematically illustrates embodiments a method for modifying configurations;

FIG. 6 is a flowchart schematically illustrating embodiments of a method in a wireless device;

FIG. 7 is a flowchart schematically illustrating embodiments of a method in a network node;

FIG. 8 is a block diagram schematically illustrating embodiments of a wireless device.

DETAILED DESCRIPTION

Figure 1:
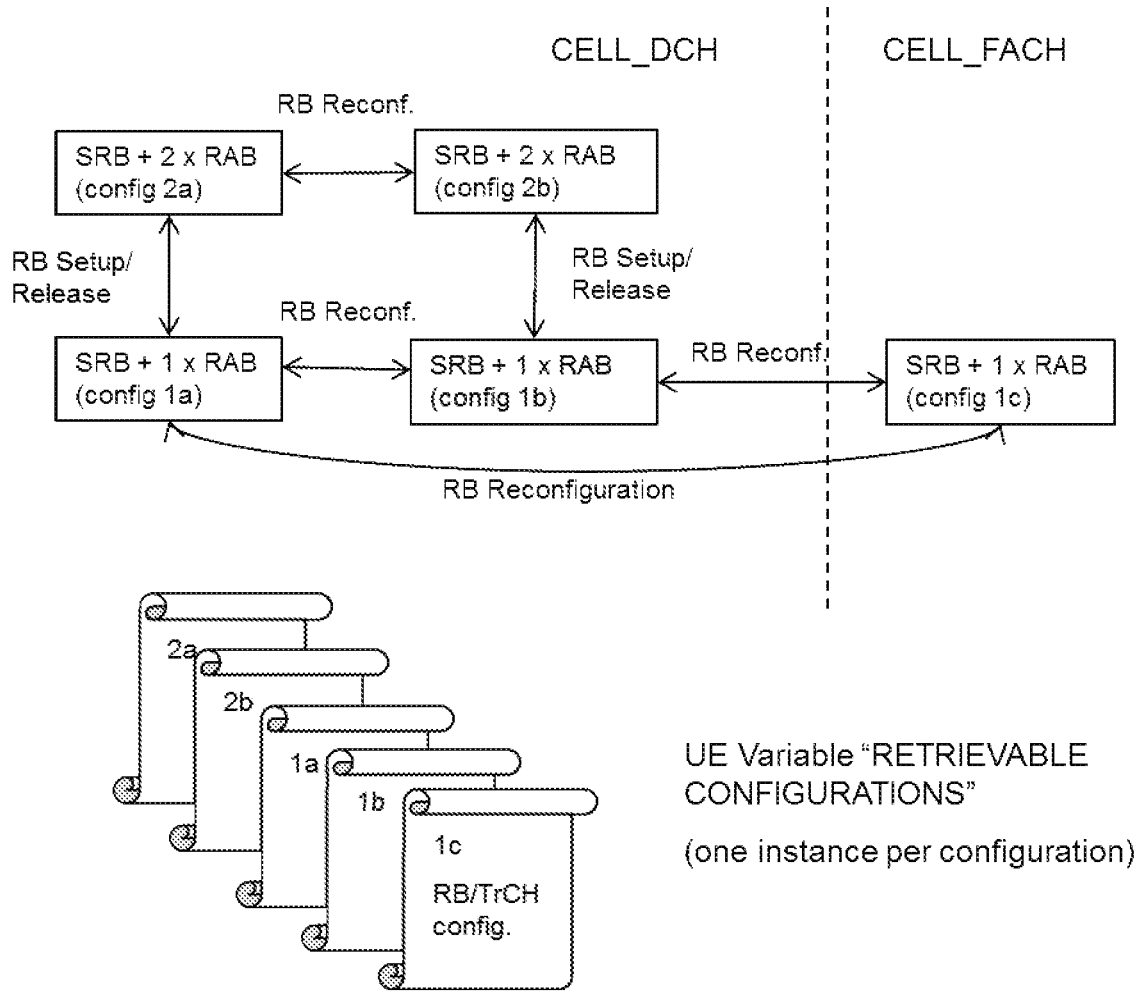
FIG. 1 schematically illustrates concepts of stored configurations according to prior art.

As part of developing embodiments herein, some problems with the state of the art wireless communications networks will first be identified and discussed.

The number of configurations that a wireless device, e.g., a UE, switches between depends on the UE capabilities and how the communications network (NW) is configured. Typically, the wireless device toggles between a set of configurations in states: Cell Dedicated CHannel (CELL_DCH), Forward Access Channel (CELL_FACH) and UTRAN Registration Area (URA) Paging channel (URA_PCH) and/or Cell Paging Channel (CELL_PCH). There may however be different connection capabilities available in different cells, e.g. multi carrier and/or single carrier, Enhanced Uplink (EUL) 2 ms Transmission Time Interval (TTI) and/or EUL 10 ms TTI, High Speed Random Access Channel (HS-RACH) and/or High Speed Forward Access Channel (HS-FACH), legacy RACH and/or legacy FACH etc. Using the concept for retrievable configurations described above, there is a risk that the number of configurations that the wireless device would have to store is larger than what is practically possible. Defining new configurations may also add unnecessary overhead as the delta configuration compared to the currently used source configuration must be provided in the RRC message.

In order to overcome one or more of the drawbacks with the prior art, some embodiments herein relate to a solution/procedure for modifying an already stored configuration associated with a certain identity in order to define one or several new configurations that may be stored.

Thus, embodiments herein provides for the possibility to modify configurations which are stored in the wireless device. Further, by embodiments herein, different methods of doing the modification are proposed.

Some embodiments herein relate to a procedure performed by a wireless device. The wireless device receives a reconfiguration message, e.g. an RRC reconfiguration message, from a UTRAN, e.g. from a RNN or a network node. Further, the wireless device modifies one or more stored configuration or parts thereof. The wireless device may further store the modified configuration or a new configuration. Furthermore, the wireless device may transmit an RRC reconfiguration response message, e.g. an RRC reconfiguration complete message or an RRC reconfiguration failure message, to the UTRAN.

Further, some embodiments herein relate to a procedure performed in the UTRAN, e.g. performed by the network node and/or the RNN. The UTRAN may transmit a set of configuration parameters to the wireless device. Further, the UTRAN decides that one or more configurations need to be changed or that one or more new configuration need to be defined and transmits an reconfiguration message, e.g. an RRC reconfiguration message to the wireless device. Furthermore, the UTRAN may receive an RRC reconfiguration response message, e.g. an RRC reconfiguration complete message or an RRC reconfiguration failure message, from the wireless device.

Furthermore, some embodiments herein relate to the wireless device and the network node comprising means configured to perform one or more actions described herein.

Embodiments herein comprise one or more other modules configured to realise features and to perform actions described herein.

Figure 2:
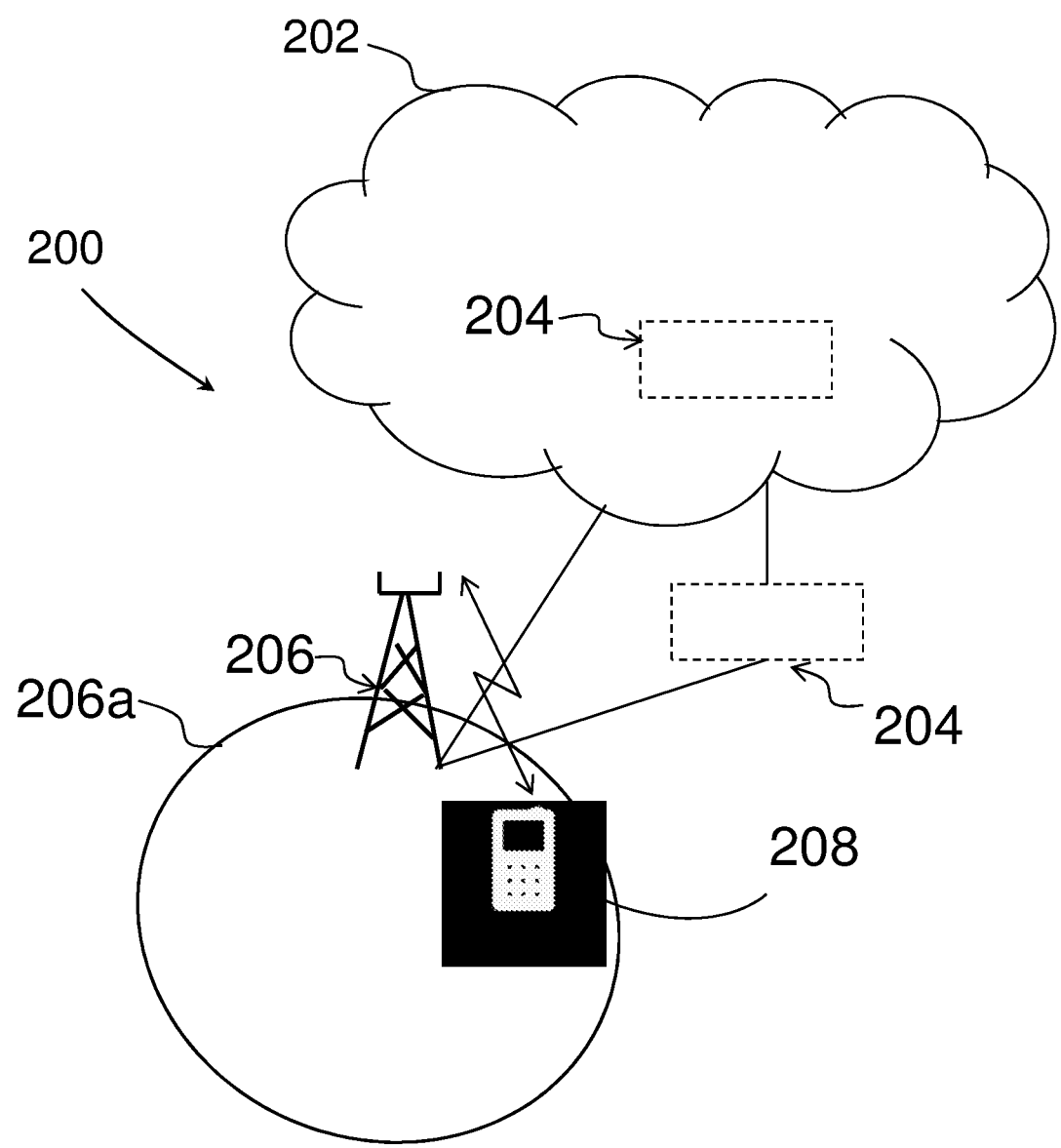
FIG. 2 schematically illustrates embodiments of a communications network.

A wireless communications network 200 is schematically illustrated in FIG. 2. The wireless communications network 200 may be an Universal Mobile Telecommunications System (UMTS) network, e.g. an UTRAN, an LTE network, a WCDMA network, an GSM network, any 3GPP cellular network, Wimax, or any other wireless communication network or system.

The wireless communications network 200 comprises a core network 202. The core network 202 may be an UMTS core network, an LTE core network, a WCDMA core network, an GSM core network, any 3GPP cellular core network, a Wimax core network, or a core network of any other wireless communication network or system.

A network node 204 may be comprised in or arranged in communication with the core network 202. The network node 204 may be a Radio Network Controller (RNC) operating in an UMTS network. In some embodiments, the network node 204 is a Base Station Controller (BSC), a Mobile Switching Center (MSC), a Media Gateway (MGw), a Serving GPRS Support Node (SGSN) or a Mobility Management Entity (MME). Further, in some embodiments, the network node 204 is a base station.

A Radio Network Node (RNN) 206 is arranged and configured to operate in the wireless communication network 100. The RNN 206 is configured for wireless communication with wireless devices, such as a wireless device 208, when they are located within a geographical area 206a served by the RNN 206.

The RNN 206 may be a transmission point such as a radio base station, for example an eNB, an eNodeB, or an Home Node B, an Home eNode B or any other network node capable to serve a user equipment or a machine type communication device in a wireless communications network, such as the wireless communications network 200. The RNN may further be configured to communicate with the network node 204.

The wireless device 208, herein also referred to as a communication device, a user equipment or UE, operates in the wireless communications network 200. The wireless device 208 may e.g. be a user equipment, a mobile terminal or a wireless terminal, a mobile phone, a computer such as e.g. a laptop, a Personal Digital Assistant (PDA) or a tablet computer, sometimes referred to as just a tablet, with wireless capability, or any other radio network units capable to communicate over a radio link in the wireless communications network 200. Please note the term user equipment used in this document also covers other wireless devices such as Machine to Machine (M2M) devices, even though they do not have any user.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

The embodiments herein are exemplified to the case of the UMTS technology. However, such embodiments may be applied to any other technology where for example the problem of large signaling overhead or reduced UE memory capacity needs to be solved.

Figure 3:
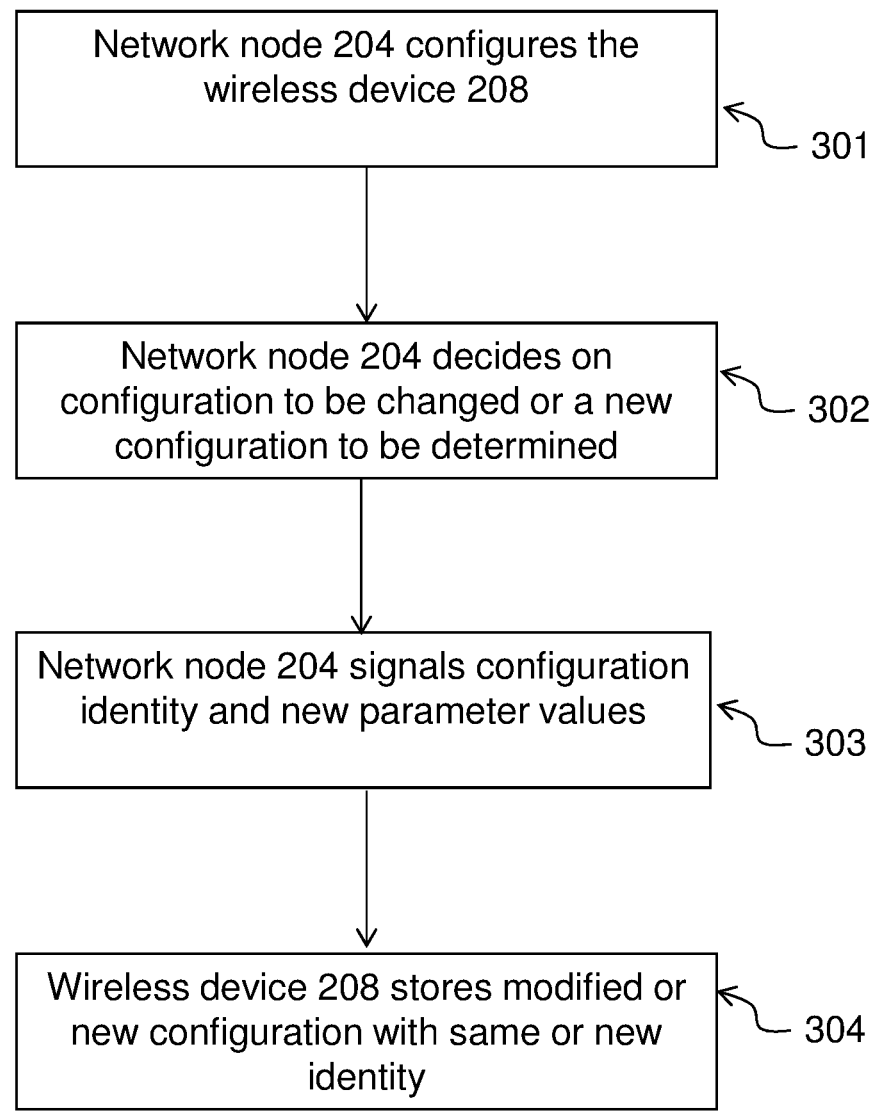
FIG. 3 schematically illustrates embodiments of a method for modifying configurations.

FIG. 3 schematically illustrates embodiments of a method for modifying stored configurations. When used herein, the term configuration refers to a set of parameters and their values. Further, the configuration specifies one or more RAB parameters, one or more RB parameters, one or more Transport channel parameters, and/or one or more Physical channel parameter. Furthermore, the configuration specifies the mapping to be applied by the wireless device 208. The configuration is signaled in one or more RRC messages. One or more of the Actions below may be combined and/or performed in another suitable order. Further, one or more actions may be optional.

In Action 301, the network node 204, e.g. the RNC, may configure the wireless device 208 with a set of configurations. The set may comprise one or more configurations. The one or more configurations may be different configurations, e.g. the one or more configurations may be different from each other. The network node 204 may configure the wireless device 208 by transmitting a configuration signal, e.g. a configuration message or a reconfiguration message, comprising the set of configurations. This relates to Actions 601 and 701, cf. FIGS. 6 and 7, respectively, which will be described below.

In Action 302, the network node 204, e.g. the RNC, decides that one or more of the configurations need to be changed or that one or more new configuration needs to be defined. For example, the network node 204 may make the decision based on one or more activity in the wireless device 208. For example, it may be that the wireless device 208 has moved or that the throughput has increased or decreased due to increased or decreased activity in the wireless device 208. This relates to Action 702, cf. FIG. 7, which will be described below.

In Action 303, the network node 204, e.g. the RNC, transmits to the wireless device 208, one or more configurations identities and one or more parameter values, e.g. one or more new parameter values. Further, the network node 204 may transmit an indication for a removal and/or change of one or more configuration parameter values. The indication may be an implicit indication such as a configuration identity (id) or an explicit indication such as a specific flag indicating that there is a change. This relates to Actions 602 and 703, cf. FIGS. 6 and 7, respectively, which will be described below.

In Action 304, the wireless device 208 stores the one or more modified configurations or the one or more new configuration with the same identity or with one or more new identities. This relates to Action 604, cf. FIG. 6, which will be described in more detail below.

A basic principle of some embodiments described herein, is that an already stored configuration is used as input, and a delta, e.g. a difference, to the input configuration is signaled, e.g. in an RRC message, which generates a result configuration. The delta is, comprises and/or relates to one or more parameters of the configuration which one or more parameters have new values. The delta is sometimes herein referred to as a delta value. Further, in this disclosure, the terms "delta", "delta value", and "difference" are be used interchangeably. The modification of stored configurations may be done in different ways as schematically illustrated in FIGS. 4a-4e.

As previously mentioned, the configuration may comprise one or more parameters and their values. The configuration may also comprise or be associated with an identity, e.g. a number or an type of identifier, which identity identifies the configuration. The identity may be used for identifying a configuration and possible also for retrieving a stored configuration.

The input configuration may be a configuration that the wireless device 208 has stored with a certain identity, but it may also be a configuration that the wireless device 208 is currently using.

Figures 4A, 4B, 4C, 4D, 4E:
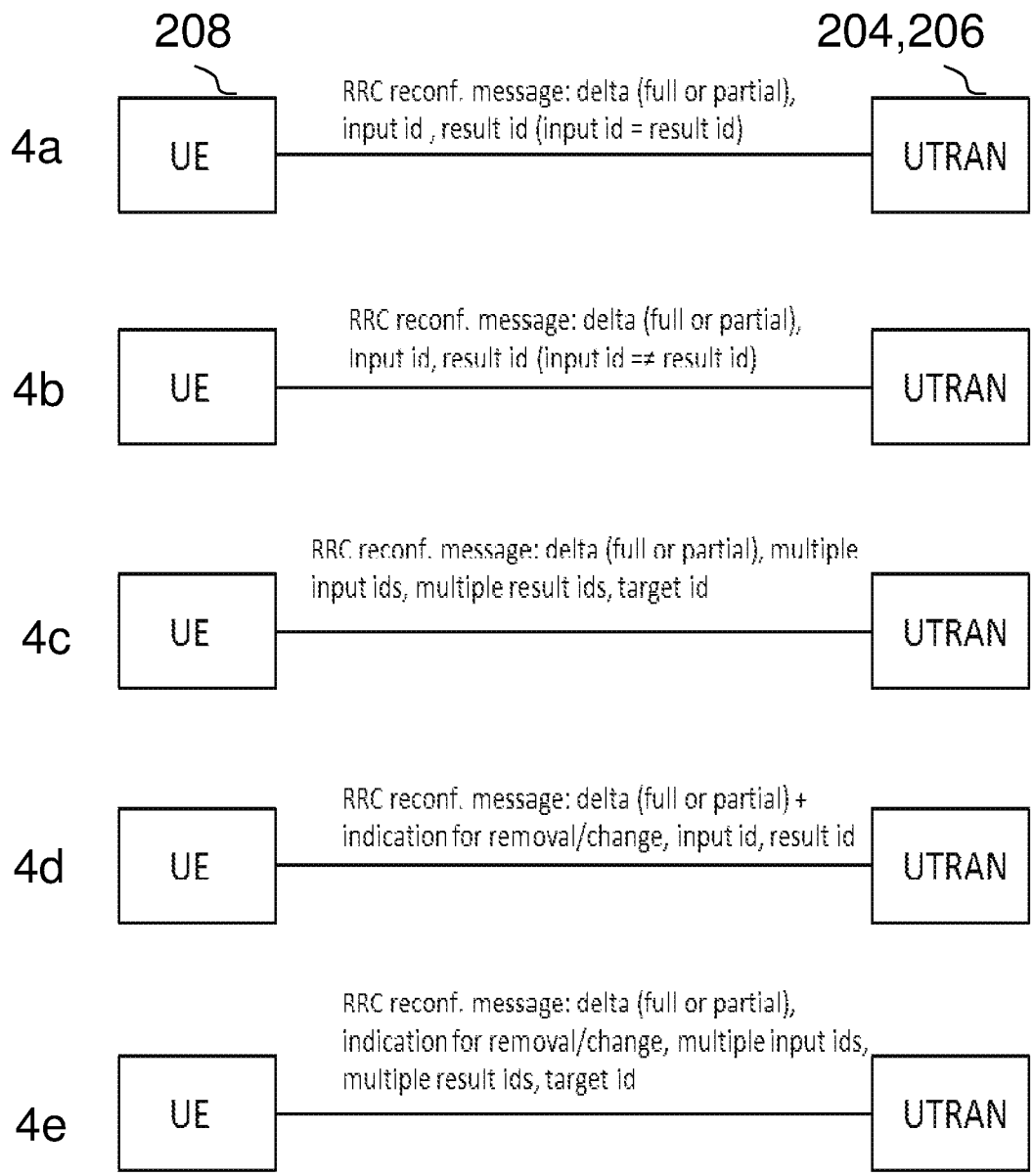
FIGS. 4a-4e schematically illustrate modification options in the RRC interface according to embodiments.

The result configuration may be a new configuration with the same identity as the input configuration. The input configuration has then changed according to the delta, but keeps the same identity, cf. FIG. 4a. As schematically illustrated in FIG. 4a, the RRC reconfiguration message comprises the delta value(-s) which may be or relate to the full, e.g. the entire, stored configuration or a part thereof. The RRC reconfiguration message may also comprise one or more input identities (input ID) and/or one or more result identities (result ID). However, in FIG. 4a only one input identity and one result identity is shown. In the embodiments illustrated in FIG. 4a, the input ID is equal to the result ID. For example, this may be the case when a configuration with identity 1 is changed to another configuration, also with identity 1.

The result configuration may also be a configuration associated with a different identity than the input configuration. The input configuration may then be kept as a configuration with the same identity and parameter values as before, but a new configuration with a new identity may be created according to the input configuration plus the delta, cf. FIG. 4b. As schematically illustrated in FIG. 4b, the RRC reconfiguration message comprises the delta value(-s) which may be or relate to the full, e.g. the entire, stored configuration or a part thereof. The RRC reconfiguration message may also comprise an input ID and/or a result ID. In the embodiments illustrated in FIG. 4b, the input ID is different from the result ID. For example, this may be the case when a configuration with identity 1 is changed to another configuration with identity 4.

To make further improvements it may also be possible to modify more than one configuration in one RRC message. That would mean signaling multiple input configurations and multiple result configurations in one RRC message. The delta will then apply to all input configurations and generate result configurations with the same or different identity as used for the input configurations. There may then also be an alternative way to signal which of the result configurations that should be the target configuration that the wireless device 208 should use after the reconfiguration, cf. FIG. 4c. Thus, there may be a new way of signaling which of the configurations that is the target configuration, as compared to previously when only one configuration has been provided in the message. As schematically illustrated in FIG. 4c, the RRC reconfiguration message comprises the delta value(-s) which may be or relate to the full, e.g. the entire, stored configuration or a part thereof. The RRC reconfiguration message may also comprise multiple input IDs and/or multiple result IDs. In the embodiments illustrated in FIG. 4c, the RRC reconfiguration message also comprises a target identity (target ID) that identifies the configuration the wireless device 208 should use after the reconfiguration. For example, this may be the case when configurations with identities 1, 2 and 3 are changed to other configurations with identities 3, 4 and 5. The configuration that the wireless device should use when the reconfiguration procedure is completed may for example be configuration 4.

The delta signaled may be either a full change where all stored parameters defining the configuration are changed, or a partial change where one or more of the parameters are changed.

When modifying stored configurations, if a parameter value is not signaled as a delta, the UE 208 should keep the old setting of this parameter value, i.e. the parameter value already stored for the input configuration.

There may also be a need to deactivate part of a configuration by removing one or more, e.g. certain, parameter values from a configuration stored in the wireless device 208. This may be done by explicitly signaling an indication to the wireless device 208 to remove and/or deactivate that parameter value from the stored configuration, cf. FIGS. 4d and 4e. Possibly the indication may also be used to explicitly indicate that a certain parameter has changed value. For example, this may be the case when configurations 1, and 3 are changed to configurations 4 and 5 and one configuration is removed. The configuration that the wireless device should use when the reconfiguration procedures may for example be configuration 5.

As schematically illustrated in FIG. 4d, the RRC reconfiguration message comprises the delta value(-s) which may be or relate to the full, e.g. the entire, stored configuration or a part thereof. The RRC reconfiguration message may also comprise an input ID and/or a result ID. The input ID may be equal to or different from the result ID. In the embodiments illustrated in FIG. 4d, the RRC reconfiguration message may also comprise the indication to remove and/or change one or more parameter values from one or more stored configurations. However, in FIG. 4d the RRC reconfiguration message comprises the indication to remove and/or change one or more parameter values from one stored configuration.

As schematically illustrated in FIG. 4e, the RRC reconfiguration message comprises the delta value(-s) which may be or relate to the full, e.g. the entire, stored configuration or a part thereof. The RRC reconfiguration message may also comprise multiple input IDs and/or multiple result IDs. The input IDs may be equal to or different from the result IDs. In the embodiments illustrated in FIG. 4d, the RRC reconfiguration message may also comprise the indication to remove and/or change one or more parameter values from one or more stored configurations. In the embodiments illustrated in FIG. 4e, the RRC reconfiguration message also comprises a target identity (target ID) that identifies the configuration the wireless device 208 should use after the reconfiguration.

One option may also be to modify stored configurations, but not to change the target configuration of the wireless device 208. There is then a need to indicate to the wireless device 208 that it should not reconfigure as a result of the reconfiguration message, but only modify the stored configurations. That is, the wireless device 208 should modify one or more configurations, but it should not change the configuration it is using.

The implementation of some embodiments described herein, may be to introduce one or more new RRC messages, e.g. one or more new RRC reconfiguration messages, or to modify one or more existing RRC messages, e.g. one or more existing RRC reconfiguration messages, such as the Radio Bearer Reconfiguration message. FIG. 5 schematically illustrates a signaling scheme wherein the communications network 200, e.g. the UTRAN, e.g. by means of a RNN 206, such as a base station, or a network node 204, such as an RNC, transmits an RRC message to the wireless device 208. The RRC message comprises one or more modification options of one or more UE configuration, which UE configuration may be stored in the wireless device 208. Upon receipt of the RRC message, the wireless device 208 changes one or more of the UE configurations, e.g. one or more stored configurations. When the change is completed, the wireless device 208 may inform the communications network 200, e.g. the RNN 206 or the network node 204, about the completion by for example transmitting an RRC message acknowledgement to the communications network 200, e.g. to the RNN 206 or the network node 204.

When an RRC reconfiguration is combined with modification of a stored configuration and the wireless device 208, for some reason, fails with either the modification or with the reconfiguration, a new error handling may need to be introduced. In such cases, the wireless device 208 may need to have an option to indicate that either the modification or the reconfiguration has failed and the appropriate actions for the different scenarios need to be specified. Examples of different scenarios may be different failure cases. Such an indication may be comprised in an RRC reconfiguration response message sent from the wireless device 208 to the communications network 200, e.g. to the RNN 206 or the network node 204.

FIG. 6 schematically illustrates a method in the wireless device 208 for modifying a configuration. In other words, FIG. 6 schematically illustrates a method performed by the wireless device 208 for modifying a configuration. The wireless device is operating in the wireless communications network 200. One or more of the Actions below may be combined and/or performed in another suitable order. Further, one or more actions may be optional. For example, the Actions in FIG. 6 marked with dashed lines may be optional.

Action 601

In order to for example configure the wireless device 208, the wireless device may receive a set of configuration parameters from the communications network 200, e.g. from the RNN 206 or the network node 204. As previously mentioned, the set may comprise one or more configurations.

The set of configuration parameters may relate to one or more configurations to be stored by the wireless device 208, and each configuration may be associated with an identity.

This Action relates to Action 301 previously described.

Action 602

The wireless device 208 receives a reconfiguration message comprising a difference relating to one or more parameters of a configuration, which configuration is associated with a first identity and stored in the wireless device 208. This may be done to change a configuration of the wireless device 208.

The difference may be a difference between a result parameter value and an input parameter value.

In some embodiments, the difference relates to one or more parameters of one or more further stored configurations.

The reconfiguration message, e.g. an RRC reconfiguration message, may be received from the communications network 200, e.g. from the RNN 206 or the network node 204. Thus, the wireless device 208 may receive the reconfiguration message from the network node 204 operating in the wireless communications network 200.

In some embodiments, the reconfiguration message comprises a target identity associated with a configuration which is to be used by the wireless device 208 after completion of the modification.

This Action relates to Action 303 previously described.

Action 603

The wireless device 208 modifies, based on the difference, the one or more parameters of the stored configuration, which modification results in a result configuration. Thus, the wireless device 208 modifies one or more stored configurations or parts thereof.

The stored configuration may be a configuration in use by the wireless device 208.

In some embodiments, the wireless device 208 modifies, based on the difference, the one or more parameters of the stored configuration by deactivating one or more parameters of the stored configuration.

The wireless device 208 may modify only parameters to which the difference is related.

In some embodiments, wherein the difference relates to one or more parameters of one or more further stored configurations, the wireless device 208 modifies, based on the difference, one or more parameters of the one or more further stored configurations.

Action 604

The wireless device 208 stores the result configuration with a second identity. Thus, the wireless device 208 may further store the modified configuration or a new configuration. The second identity may be or correspond the first identity or a new identity. Thus, the configuration may be stored with the same or a new identity.

This Action relates to Action 304 previously described.

Action 605

The wireless device 208 may transmit an RRC reconfiguration response message, e.g. an RRC reconfiguration complete message or an RRC reconfiguration failure message, to the communications network 200, e.g. to the RNN 206 or the network node 204.

Action 606

In some embodiments, wherein the reconfiguration message comprises a target identity associated with a configuration which is to be used by the wireless device 208 after completion of the modification, the wireless device 208 uses, e.g. applies or invokes, the configuration associated with the target identity after completion of the modification.

In some embodiments, the target identity is associated with a configuration already in use by the wireless device 208 but the target identity may also be associated with a new configuration different from the configuration in use and in such embodiments the wireless device 208 has to be reconfigured with the new configuration.

FIG. 7 schematically illustrates a method in the wireless communications network 200, e.g. in the network node 204 or the RNN 206 for assisting the wireless device 208 to modify a configuration. In other words, FIG. 7 schematically illustrates a method performed by the network node 204 or the RNN 206 for assisting the wireless device 208 to modify a configuration. In the description below, reference will be made to a method performed by the network node 204, but it should be understood that the method may be performed by the RNN 206.

Thus, a method performed by the network node 204 for assisting the wireless device 208 to modify a configuration will now be described with reference to FIG. 7. The wireless device 208 and the network node 204 are operating in the wireless communications network 200.

One or more of the Actions below may be combined and/or performed in another suitable order. Further, one or more actions may be optional. For example, the Actions in FIG. 7 marked with dashed lines may be optional.

Action 701

The network node 204 may transmit a set of configuration parameters to the wireless device 208. The set of configuration parameters may relate to one or more configurations to be modified by the wireless device 208, and each configuration may be associated with a respective identity.

As previously mentioned, the set may comprise one or more configurations.

This Action relates to Action 301 previously described.

Action 702

The network node 204 decides on a modification of one or more parameters of a configuration. The modification is to be performed by the wireless device 208 and the configuration is associated with a first identity and stored in the wireless device 208. Thus, the network node 204 decides that one or more configurations need to be changed or that one or more new configuration need to be defined.

The stored configuration may be a configuration in use by the wireless device 208. The network node 204 may decide on the modification of the one or more parameters by deciding that the one or more parameters of the stored configuration are to be modified by deactivating the one or more parameters.

In some embodiments, the network node 204 decides on the modification of the one or more parameters by deciding that one or more parameters of one or more further configurations stored in the wireless device 208 are to be modified.

This Action relates to Action 302 previously described.

Action 703

The network node 204 transmits, to the wireless device 208, a reconfiguration message comprising a difference relating to the modification of the one or more parameters of the stored configuration.

In some embodiments, the network node 204 transmits an reconfiguration message, e.g. an RRC reconfiguration message to the wireless device 208.

The difference may be a difference between a result parameter value and an input parameter value.

In some embodiments, the difference relates to the one or more parameters of the one or more further stored configurations.

The reconfiguration message may further comprise a target identity associated with a configuration which is to be used by the wireless device 208 after completion of the modification.

This Action relates to Action 303 previously described.

Action 704

The network node 204 receives an RRC reconfiguration response message, e.g. an RRC reconfiguration complete message or an RRC reconfiguration failure message, from the wireless device 208.

Figure 9:
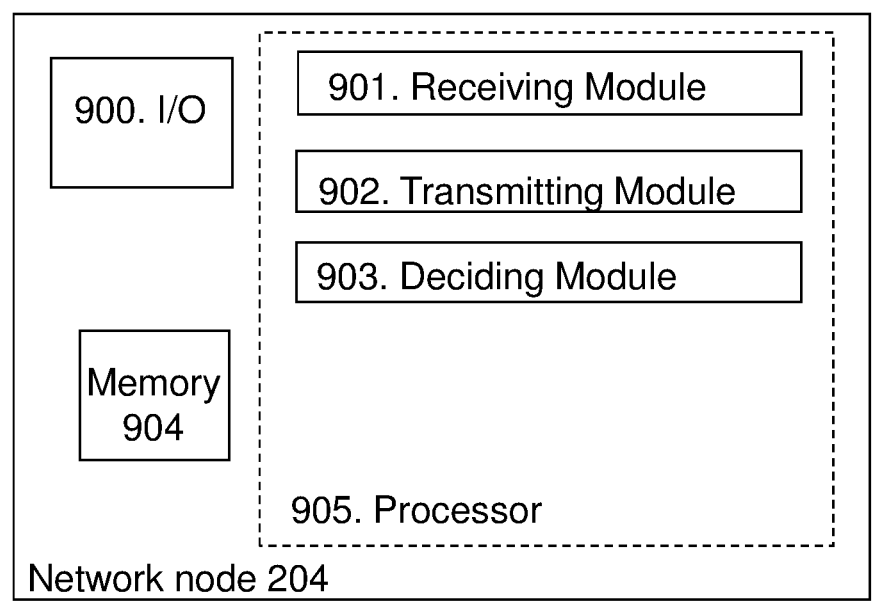
FIG. 9 is a block diagram schematically illustrating embodiments of a network node.

As schematically illustrated in FIGS. 8 and 9, the embodiments herein may be implemented through one or more processors, such as a processor 805 in the wireless device 208 and a processor 905 in the communications network 200, e.g. in the network node 204 and/or the RNN 206, together with computer program code for performing the functions and actions of the embodiments herein. The program code may be implemented in one or several network nodes both in the cellular network and/or in a non-cellular network and/or in the communication device (e.g. UE and/or STA). The program code mentioned above may also be provided as a computer program product, for instance in the form of a data carrier carrying computer program code for performing the embodiments herein when being loaded into network node or communication device. One such carrier may be in the form of a CD ROM disc. It is however feasible with other data carriers such as a memory stick. The computer program code may furthermore be provided as pure program code on a server and downloaded to the network node or the communication device.

The communications network 200, e.g. the radio network node 206 or the network node 204, and the wireless device 208 may further comprise a respective memory 804,904 comprising one or more memory units. The memory is arranged to be used to store obtained information, store data, configurations, schedulings, and applications etc. to perform the methods herein when being executed in the RAN or the communication device.

The communications network 200, e.g. the radio network node 206 or the network node 204, and the wireless device 208 may further comprise means 800,801,802,803; 900,901, 902,903 configured to transmit messages, receive messages, to configure the communication device with a set of configurations, to decide that one or more configurations needs to be changed or that one or more new configuration is needed, to modify a configuration etc. Such means may be realised by an input/output interface 800,900, a receiving module 801,901, a transmitting module 802,902, a configuring module, a modifying module 803, a deciding module 903, etc. adapted to transmit, receive, configure, modify, decide etc. as described herein.

Thus, to perform the method for modifying a configuration, the wireless device 208 may be configured according to an arrangement depicted in FIG. 8. The wireless device 208 is configured to operate in the wireless communications network 200.

The wireless device 208 comprises an input and/or output interface 800 configured to communicate within the communications network 200, e.g. with the network node 204 and/or the RNN 206. The input and/or output interface 800 may comprise a wireless receiver (not shown) and a wireless transmitter (not shown).

The wireless device 208 is configured to receive, by means of a receiving module 801 configured to receive, a reconfiguration message.

The receiving module 801 may be implemented by or arranged in communication with a processor 805 of the wireless device 208. The processor 805 will be described in more detail below.

The reconfiguration message comprises a difference relating to one or more parameters of a configuration, which configuration is associated with a first identity and stored in the wireless device 208.

The difference may be a difference between a result parameter value and an input parameter value.

In some embodiments, the difference relates to one or more parameters of one or more further stored configurations.

The stored configuration may be a configuration in use by the wireless device 208.

In some embodiments, the wireless device 208 is configured to receive the reconfiguration message from a network node 204 operating in the wireless communications network 200.

The wireless device 208 may be configured to receive a set of configuration parameters from the network node 204. In some embodiments, the set of configuration parameters relates to one or more configurations to be stored by the wireless device 208, and wherein each configuration is associated with an identity.

In some embodiments, the reconfiguration message further comprises a target identity associated with a configuration which is to be used by the wireless device 208 after completion of the modification. In such embodiments, the wireless device 208 is configured to use the configuration associated with the target identity after completion of the modification.

In some embodiments, the wireless device 208 is configured to transmit, by means of a transmitting module 802 configured to transmit, a response message to the network node 204.

The transmitting module 802 may be implemented by or arranged in communication with the processor 805 of the wireless device 208.

In some embodiments, the wireless device 208 is configured to transmit an RRC reconfiguration response message, e.g. an RRC reconfiguration complete message or an RRC reconfiguration failure message.

The wireless device 208 is configured to modify, by means of a modifying module 803 configured to modify, a parameter of a configuration.

The modifying module 803 may be implemented by or arranged in communication with the processor 805 of the wireless device 208.

The wireless device 208 is configured to modify, based on the difference, the one or more parameters of the stored configuration, which modification results in a result configuration.

In some embodiments, the wireless device 208 is configured to modify, based on the difference, the stored configuration by deactivating one or more parameters of the stored configuration.

The wireless device 208 may be configured to modify only parameters to which the difference is related.

In some embodiments, wherein the difference relates to one or more parameters of one or more further stored configurations, the wireless device 208 is configured to modify, based on the difference, one or more parameters of the one or more further stored configurations.

Further, the wireless device 208 is configured to store the result configuration with a second identity in for example the memory 804. The second identity may be the first identity or a new identity.

Further, to perform the method for assisting the wireless device 208 to modify a configuration, the network node 204 may be configured according to an arrangement depicted in FIG. 9. The wireless device 208 and the network node 204 are configured to operate in the wireless communications network 200.

The network node 204 comprises an input and/or output interface 900 configured to communicate within the wireless device 204 and/or the RNN 206. The input and/or output interface 900 may comprise a wireless receiver (not shown) and a wireless transmitter (not shown).

The network node 204 is configured to receive, by means of a receiving module configured to receive, a reconfiguration message.

The receiving module 901 may be implemented by or arranged in communication with a processor 905 of the network node 204. The processor 905 will be described in more detail below.

The network node 204 is configured to transmit, by means of a transmitting module 902 configured to transmit, a reconfiguration message.

The transmitting module 902 may be implemented by or arranged in communication with the processor 905 of the network node 204.

The network node 204 is configured to transmit, to the wireless device 208, the reconfiguration message comprising a difference relating to the modification of the one or more parameters of the stored configuration.

The difference may be a difference between a result parameter value and an input parameter value.

In some embodiments, the difference further relates to the one or more parameters of the one or more further stored configurations.

The network node 204 may be configured to transmit a set of configuration parameters to the wireless device 208. This may be the case when the network node 204 configures the wireless device 208.

The set of configuration parameters may relate to one or more configurations to be modified by the wireless device 208, and each configuration may be associated with a respective identity.

In some embodiments, the reconfiguration message comprises a target identity associated with a configuration which is to be used by the wireless device 208 after completion of the modification.

The network node 204 is configured to decide, by means of a deciding module configured to decide, a modification.

The deciding module 903 may be implemented by or arranged in communication with the processor 905 of the network node 204.

The network node 204 is configured to decide on a modification of one or more parameters of a configuration, which modification is to be performed by the wireless device 208, wherein the configuration is associated with a first identity and stored in the wireless device 208.

The stored configuration may be a configuration in use by the wireless device 208.

In some embodiments, the network node 204 is configured to decide that the one or more parameters of the stored configuration are to be modified by deactivating the one or more parameters.

The network node may be configured to decide that one or more parameters of one or more further configurations stored in the wireless device 208 are needed to be modified. This may be the case when the more than one configuration is to be modified.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RAN, the network node and communication device perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of". Further, the word "a" or "an" should be understood to refer to "at least one" or to "one or more" if not explicitly stated that it refers to a "single" entity.

The embodiments herein are not limited to the above described preferred embodiments. Various alternatives, modifications and equivalents may be used.

The invention claimed is:

1. A method performed by a wireless device for modifying a configuration,
wherein the wireless device is operating in a wireless communications network, and
wherein the method comprises:
receiving, from a network node operating in a wireless communication network, a reconfiguration message comprising an input identity (input ID), result identity (result ID), a target identity (target ID), an indication to remove or change one or more parameter values from a stored configuration, and a difference, between a result parameter value and an input parameter value, relating to one or more parameters of a configuration, which the configuration is associated with a first identity and stored in the wireless device;
modifying, by deactivating other than the one or more parameters of the stored configuration, only parameters to which the difference is related, based on the indication and the difference, the one or more parameters of the stored configuration, which the modification results in a result configuration;
storing the result configuration with the result identity being different from the first identity; and
using one stored configuration, among the one or more stored configurations, associated with the received target identity after completion of the modification,
wherein, the input identity is an identity of a configuration that the wireless device has stored or an identity of a configuration that the wireless device is currently using,
and the target identity identifies the one stored configuration the wireless device should use after the completion of the modification.

2. The method of claim 1, wherein the stored configuration is a configuration in use by the wireless device.

3. The method of claim 1, wherein the difference further relates to one or more parameters of one or more further stored configurations.

4. The method of claim 3, wherein the modifying further comprises modifying, based on the difference, one or more parameters of the one or more further stored configurations.

5. The method of claim 1, wherein the set of configuration parameters relates to one or more configurations to be stored by the wireless device, and wherein each configuration is associated with an identity.

6. A wireless device for modifying a configuration, wherein the wireless device is operable in a wireless communications network, and wherein the wireless device comprises:
a wireless receiver and a wireless transmitter; and
a processor circuit configured to:
receive, from a network node operating in the wireless communication network, a reconfiguration message by way of the wireless receiver, the reconfiguration message comprising an input identity (input ID), result identity (result ID), a target identity (target ID), an indication to remove or change one or more parameter values from a stored configuration, and a difference between a result parameter value and an input parameter value relating to one or more parameters of one or more configurations, wherein the one or more configurations are associated with one or more first identities and stored in the wireless device;

modify, by deactivating other than the one or more parameters of the one or more stored configurations, only parameters to which the difference is related, based on the indication and the difference, the one or more parameters of the stored configuration, which the modification results in a result configuration;

store the result configuration with the result identity being different from the first identity; and use one stored configuration, among the one or more stored configurations, associated with the received target identity after completion of the modification, wherein, the input identity is an identity of a configuration that the wireless device has stored or an identity of a configuration that the wireless device is currently using, and the target identity identifies the one stored configuration the wireless device should use after the completion of the modification.

7. The wireless device of claim 6, wherein the stored configuration is a configuration in use by the wireless device.

8. The wireless device of claim 6, wherein the difference further relates to one or more parameters of one or more further stored configurations.

9. The wireless device of claim 8, wherein the processor circuit further is configured to modify, based on the difference, one or more parameters of the one or more further stored configurations.

10. The wireless device of claim 6, wherein the set of configuration parameters relates to one or more configurations to be stored by the wireless device, and wherein each configuration is associated with an identity.

11. A non-transitory computer-readable medium comprising, stored thereupon, a computer program comprising instructions that, when executed on at least one processor of a wireless device operating in the wireless communication network, causes the at least one processor to:

receive, from a network node operating in the wireless communication network, a reconfiguration message by way of a wireless receiver, the reconfiguration message comprising an input identity (input ID), result identity (result ID), a target identity (target ID), an indication to remove or change one or more parameter values from a stored configuration, and a difference between a result parameter value and an input parameter value relating to one or more parameters of one or more configurations, wherein the one or more configurations are associated with one or more first identities and stored in the wireless device;

modify, by deactivating other than the one or more parameters of the stored configuration, only parameters to which the difference is related, based on the indication and the difference, the one or more parameters of the stored configuration, which the modification results in a result configuration;

store the result configuration with the result identity being different from the first identity; and use one stored configuration among the one or more stored configurations, associated with the received target identity after completion of the modification, wherein, the input identity is an identity of a configuration that the wireless device has stored or an identity of a configuration that the wireless device is currently using, and the target identity identifies the one stored configuration the wireless device should use after the completion of the modification.

* * * * *